United States Patent [19]

Schumann et al.

[11] Patent Number: 5,017,422

[45] Date of Patent: May 21, 1991

[54] CAST FILMS OF ABS PLASTICS

[75] Inventors: Werner Schumann, Pulheim; Werner Tischer, Dormagen, both of Fed. Rep. of Germany

[73] Assignee: Bayer Aktiengesellschaft, Leverkusen, Fed. Rep. of Germany

[21] Appl. No.: 202,019

[22] Filed: Jun. 3, 1988

[30] Foreign Application Priority Data

Jun. 13, 1987 [DE] Fed. Rep. of Germany ....... 3719489

[51] Int. Cl.$^5$ .............................................. B32B 27/00
[52] U.S. Cl. .................................... 428/216; 428/520; 428/522; 428/463; 525/65; 525/67
[58] Field of Search .................... 525/65, 67; 428/520, 428/522, 463, 216

[56] References Cited

U.S. PATENT DOCUMENTS

| 3,930,109 | 12/1975 | Brandt et al. | 428/463 |
| 4,076,769 | 2/1978 | Watts | 260/893 |
| 4,381,359 | 4/1983 | Idel | 524/117 |
| 4,766,165 | 8/1988 | Kress . | |
| 4,812,514 | 3/1989 | Priddy et al. | 525/92 |
| 4,857,591 | 8/1989 | Eichenauer et al. | 525/74 |

Primary Examiner—Edith R. Buffalow
Attorney, Agent, or Firm—Connolly and Hutz

[57] ABSTRACT

The invention relates to monofilms of ABS plastics or blends thereof with other thermoplasts having a film thickness of from 1 to 200 μm which are self-supporting and transparent and are capable of being colored and electroplated and to a process for their production.

5 Claims, No Drawings

CAST FILMS OF ABS PLASTICS

This invention relates to monofilms of ABS plastics or blends thereof with other thermoplasts having a film thickness of from 1 to 200 μm, preferably from 5 to 100 μm, which are self supporting, transparent and flame resistant and can be coloured and printed and electroplated and antistatically finished.

ABS plastics in the context of this invention are graft polymers of resin forming monomers on a rubber, optionally in admixture with a copolymer of the resin-forming or similar monomers.

The graft basis of the graft polymer is preferably a diene rubber such as polybutadiene, polyisoprene or a copolymer of butadiene and styrene. Acrylate rubbers such as polybutyl acrylate and EPDM rubbers, e.g. rubbers of ethylene, propylene and a non-conjugated diene such as norbornadiene are also suitable. All the rubbers used as graft basis are at least partially cross-linked.

The graft monomers are preferably styrene, styrenes substituted in the nucleus or side chain, acrylonitrile, methyl methacrylate or mixtures thereof. A mixture of styrene (50 to 90% by weight) and acrylonitrile (50 to 10% by weight) is preferred. The graft copolymer generally contains from 10 to 80% by weight of rubber, preferably from 20 to 50% by weight. Graft polymers of this type are known and their preparation belongs to the state of the art. Such graft polymers are generally obtained by polymerisation of the monomers in the presence of the rubber with the aid of radical initiators. The graft polymerisation is generally not complete and free copolymers of the graft monomers are formed in addition to the grafts which are chemically bound to the rubber. A mixture of graft polymer proper and free copolymer is therefore obtained. Additional copolymer is in many cases added to influence the properties of the material. ABS plastics of this type and methods of their preparation also belong to the state of the art.

The term "ABS" normally means acrylonitrile-butadiene-styrene plastics but is used in the present case also to include similar materials, i.e. graft polymers with rubbers other than butadiene and with graft monomers other than styrene and acrylonitrile.

According to the invention, pure ABS plastics as described above may be used for the production of the films. These plastics may also be mixed with other thermoplastic resins, e.g. aromatic polycarbonate, polyvinyl chloride or ethylene/vinyl acetate copolymer but the proportion of ABS in the mixture must be at least 50% by weight.

It has not hitherto been possible to produce self supporting thin films from such materials. It has been attempted to produce films from melts of ABS plastics by extrusion and by calandering but it has so far only been possible to obtain thicker films with thicknesses above 200 μm. It has also been attempted to produce thin films by stretching thicker films or sheets but the stretched films obtained have not been self supporting and could not be used as endless lengths. It has also been attempted to cast solutions of ABS plastics on substrates and then remove the solvent, with the result that coatings are obtained but they are not self supporting, i.e. they cannot be separated as films from the substrate.

The present invention relates to a process for the production of thin, self supporting films of ABS plastics, characterised in that a mould release agent is added to a 5 to 45% by weight solution of an ABS plastic and optionally up to 50% by weight, based on the ABS plastic, of another thermoplast in an inert organic solvent and the solution is cast on a support in known manner, the solvent is removed and the resulting film is separated from its support.

ABS plastics suitable for the process are in particular graft polymers of styrene and acrylonitrile on polybutadiene, optionally in admixture with styrene-acrylonitrile copolymers.

Further examples of thermoplastic resins include aromatic polycarbonates, polyvinyl chloride and ethylene/vinyl acetate copolymers.

The following inert solvents may be used: monochloromethane, dichloromethane, trichloromethane, tetrachloromethane, ethylene chloride, chlorobenzene, methylethyl ketone, tetrahydrofuran and optionally, in addition, methanol, ethanol, acetone, toluene, xylene, ethylene glycol and mono and diethers thereof, propylene glycol and ethers thereof, glycerol, lauryl alcohol and ethers and esters thereof and phthalic acid esters.

The mould release agents used according to the invention are preferably organic phosphates, phosphonates and phosphites, in particular those which are mono-, di- or trisubstituted with hydrocarbon groups. Suitable hydrocarbon substituents include alkyl groups with 1 to 22 carbon atoms, preferably 16 to 18 carbon atoms, which in turn may be substituted with carboxyl, sulpho or hydroxyl groups, such as methyl, ethyl, isopropyl, hexyl, n-octadecyl, 2-hexyldecyl, 2-(1-methyl-2-tert.-butyl-ethyl)-5-methyl-6-tert.-butyl-n-hexyl (also known as 2,2,4,5,8,10,10-heptamethyl methyl), carboxymethyl, dodecylsulphonyl and hydroxyhexyl groups as well as aryl groups such as phenyl and substituted aryl groups such as cresyl, tolyl or benzyl.

The following are examples of suitable mould release agents: dioctyl phosphate, mono-2-hexyl-decyl phosphate and di-2-hexyl-decyl phosphate.

The mould release agents are added to the synthetic resin solutions in quantities of about $10^{-4}$ to 1% by weight, based on the synthetic resin, before the solutions are cast.

The process may generally be carried out as follows:

The synthetic resin is dissolved in a suitable solvent, the mould release agent is added, the solution is cast on a band or a drum, e.g. of refined steel, and part of the solvent is removed by evaporation until a coherent film has formed, which can be removed from the drum or band. The remaining solvent is then removed by drying in a drying cupboard. The temperatures employed for forming the films are preferably from 20° to 60° C., depending on the solvent, and after-drying is preferably carried out at temperatures from 20° to 150° C.

The conventional additives such as pigments (carbon black, titanium dioxide), flame retardants or antistatic agents may be added to the synthetic resins or their solutions before the films are produced.

This invention is thus based on the finding that an ABS plastic may be converted by means of inert organic solvents into a suitable colloidal solution which enables it to be cast on drum casting or band casting machines to form films and that the resulting cast films can be detached from their supports if a suitable mould release agent is used so that self-supporting mono films can be obtained.

The films according to the invention are suitable for use as wrapping, covering and packaging films. They may be metallised, stretched, deep drawn and shrunken.

EXAMPLE OF PRACTICAL EMBODIMENT 250 g of ABS plastic (a graft polymer of 50 parts by weight of a styrene:acrylonitrile mixture (72:28) and 50 parts by weight of polybutadiene mixed with a styrene-acrylonitrile copolymer (72:28) in proportions by weight of 1:1) are dissolved in 750 g of dichloromethane at 20° C. and 1 ml of di-2-hexyl-decyl phosphate is added to the solution. The solution is then cast on a rotating drum of refined steel at about 20° C. The film which is formed by evaporation of solvent can be lifted from the drum after about 30 seconds. The remaining solvent is removed at 30° C. by passing the film through a drying cupboard. The resulting solvent free film has a thickness of 50 μm.

We claim:

1. A transparent, self-supporting film which comprises one or more ABS plastics which has a thickness of from 1 to 200 μm.

2. A film as claimed in claim wherein the thickness is from 5 to 10 μm.

3. A film as claimed in claim 1 wherein it is flame resistant and is printed or antistatically-finished.

4. A film as claimed in claim 2 wherein it is flame-resistant and may be printed/or antistatically-finished.

5. A film as claimed in claim 1 wherein it is colored or electroplated.

* * * * *